United States Patent
Baek et al.

(10) Patent No.: US 11,437,609 B2
(45) Date of Patent: Sep. 6, 2022

(54) METHOD OF PREPARING POSITIVE ELECTRODE ACTIVE MATERIAL FOR SECONDARY BATTERY AND SECONDARY BATTERY USING THE SAME

(71) Applicant: LG Chem, Ltd., Seoul (KR)

(72) Inventors: Hyeon Hui Baek, Daejeon (KR); Sung Ho Ban, Daejeon (KR); Jun Ho Eom, Daejeon (KR); Na Ri Park, Daejeon (KR)

(73) Assignee: LG Chem, Ltd.

( * ) Notice: Subject to any disclaimer, the term of this patent is extended or adjusted under 35 U.S.C. 154(b) by 180 days.

(21) Appl. No.: 16/615,527

(22) PCT Filed: Oct. 22, 2018

(86) PCT No.: PCT/KR2018/012415
§ 371 (c)(1),
(2) Date: Nov. 21, 2019

(87) PCT Pub. No.: WO2019/078672
PCT Pub. Date: Apr. 25, 2019

(65) Prior Publication Data
US 2020/0259161 A1     Aug. 13, 2020

(30) Foreign Application Priority Data

Oct. 20, 2017   (KR) .................. 10-2017-0136900
Oct. 19, 2018   (KR) .................. 10-2018-0125222

(51) Int. Cl.
| | |
|---|---|
| *H01M 4/04* | (2006.01) |
| *H01M 4/131* | (2010.01) |
| *H01M 4/134* | (2010.01) |
| *H01M 4/525* | (2010.01) |
| *H01M 10/0525* | (2010.01) |
| *H01M 4/505* | (2010.01) |
| *H01M 50/46* | (2021.01) |
| *H01M 4/02* | (2006.01) |

(52) U.S. Cl.
CPC ......... *H01M 4/131* (2013.01); *H01M 4/0471* (2013.01); *H01M 4/134* (2013.01); *H01M 4/505* (2013.01); *H01M 4/525* (2013.01); *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
CPC .... H01M 4/131; H01M 4/0471; H01M 4/134; H01M 4/505; H01M 4/525; H01M 10/0525; H01M 50/46; H01M 2004/021; H01M 2004/027; H01M 2004/028; H01M 4/362; H01M 4/485; H01M 4/62; H01M 10/052; C01P 2002/52; C01P 2002/50; C01P 2006/40; C01G 53/42; C01G 53/50; C01G 53/44; Y02E 60/10

See application file for complete search history.

(56) References Cited

U.S. PATENT DOCUMENTS

| | | |
|---|---|---|
| 2013/0177809 A1 | 7/2013 | Nagai |
| 2013/0309580 A1 | 11/2013 | Tomura |
| 2013/0330615 A1 | 12/2013 | Morita et al. |
| 2014/0087263 A1 | 3/2014 | Matsumoto et al. |
| 2014/0099545 A1 | 4/2014 | Cho et al. |
| 2014/0106228 A1 | 4/2014 | Toya et al. |
| 2015/0132666 A1 | 5/2015 | Ogata et al. |
| 2015/0228974 A1 | 8/2015 | Kokado et al. |
| 2016/0006029 A1 | 1/2016 | Sugaya et al. |
| 2017/0054147 A1 | 2/2017 | Yokoyama et al. |
| 2017/0207441 A1 | 7/2017 | Shen et al. |
| 2017/0207442 A1 | 7/2017 | Ho et al. |
| 2017/0207443 A1 | 7/2017 | Shen et al. |
| 2018/0323421 A1 | 11/2018 | Shen et al. |
| 2019/0123350 A1 | 4/2019 | Choi et al. |

FOREIGN PATENT DOCUMENTS

| | | |
|---|---|---|
| CN | 103155240 A | 6/2013 |
| CN | 103633329 A | 3/2014 |
| CN | 103688396 A | 3/2014 |
| CN | 106256036 A | 12/2016 |
| JP | 2012252844 A | 12/2012 |
| JP | 2017007918 A | 1/2017 |
| JP | 2017069135 A | 4/2017 |
| JP | 2017084674 A | 5/2017 |
| JP | 2018172256 A | 11/2018 |
| KR | 20160066227 A | 6/2016 |
| KR | 20170041520 A | 4/2017 |
| KR | 20170075124 A | 7/2017 |
| KR | 20170075437 A | 7/2017 |
| KR | 20170112850 A | 10/2017 |
| WO | 2012035664 A1 | 3/2012 |
| WO | 2012105048 A1 | 8/2012 |
| WO | 2012111116 A1 | 8/2012 |

(Continued)

OTHER PUBLICATIONS

Search Report for Chinese Application No. 201880033908.9 dated Jul. 31, 2021. 3 pgs.

(Continued)

*Primary Examiner* — Cynthia K Walls
(74) *Attorney, Agent, or Firm* — Lerner, David, Littenberg, Krumholz & Mentlik, LLP

(57) ABSTRACT

A method of preparing a positive electrode active material includes forming a tungsten-doped lithium transition metal oxide, and washing the lithium transition metal oxide, wherein, in the washing, a hydroxide-based compound is added to a washing liquid during the washing, a positive electrode including a positive electrode active material prepared according to the method, and a lithium secondary battery including the positive electrode.

13 Claims, No Drawings

(56) References Cited

FOREIGN PATENT DOCUMENTS

| WO | 2013108571 A1 | 7/2013 |
| WO | 2014156054 A1 | 10/2014 |
| WO | 2017124859 A | 7/2017 |

OTHER PUBLICATIONS

International Search Report for Application No. PCT/KR2018/012415 dated Apr. 12, 2019, pp. 1-3.

METHOD OF PREPARING POSITIVE ELECTRODE ACTIVE MATERIAL FOR SECONDARY BATTERY AND SECONDARY BATTERY USING THE SAME

CROSS-REFERENCE TO RELATED APPLICATIONS

The present application is a national stage entry under 35 U.S.C. § 371 of International Application No. PCT/KR2018/012415, filed Oct. 22, 2018 which claims priority to Korean Patent Application Nos. 10-2017-0136900, filed on Oct. 20, 2017, and 10-2018-0125222, filed on Oct. 19, 2018, in the Korean Intellectual Property Office, the disclosures of which are incorporated herein in their entirety by reference.

TECHNICAL FIELD

The present invention relates to a method of preparing a positive electrode active material for a secondary battery and a secondary battery using the same, and more particularly, to a method of preparing a positive electrode active material in which life characteristics of the battery may be improved by suppressing the loss of a doping compound during the preparation of the positive electrode active material.

BACKGROUND ART

Recently, in line with the miniaturization of electronic devices, a high-capacity secondary battery has been required, and, particularly, lithium secondary batteries having higher energy density than nickel-cadmium batteries and nickel-hydrogen batteries have received attention.

Lithium-containing cobalt oxide ($LiCoO_2$) is mainly used as a positive electrode active material for a lithium secondary battery, and, in addition, the uses of lithium-containing manganese oxides, such as $LiMnO_2$ having a layered crystal structure and $LiMn_2O_4$ having a spinel crystal structure, and $LiNiO_2$, as a lithium-containing nickel oxide, are also in consideration. Among these positive electrode active materials, since $LiCoO_2$ has excellent life characteristics and charge and discharge efficiency, it has been the most widely used, but, since it has low capacity and is expensive due to resource limitations of cobalt used as a raw material, $LiCoO_2$ has a limitation in price competitiveness in terms of being massively used as a power source for medium and large battery sector such as electric vehicles. Lithium manganese oxides, such as $LiMnO_2$ and $LiMn_2O$, are advantageous in that they are inexpensive due to abundance of manganese resources used as a raw material, are environmentally friendly, and have excellent thermal stability, but have limitations in that capacities are low and high-temperature characteristics and cycle characteristics are poor.

In order to compensate for these disadvantages, demand for a nickel (Ni)-rich system exhibiting high capacity, as a positive electrode active material of a secondary battery, has begun to increase. However, the nickel-rich active material has large capacity, but, since a cation mixing ratio is increased at a high temperature, the nickel-rich active material is prepared at a lower temperature than that of other positive electrode active materials to suppress the increase of the cation mixing ratio.

When the positive electrode active material is prepared at a low temperature, more lithium impurities, which have not participated in a positive electrode active material synthesis reaction, remain, and, since the lithium impurities may induce gelation during the coating of a composition including the positive electrode active material on a positive electrode collector, electrode surface defects may occur due to an agglomeration phenomenon during electrode coating. Also, since the residual lithium impurities may vaporize during charge/discharge of the battery to expand a battery case, stability and life performance of the battery may be reduced.

In order to overcome this limitation, a technique of using a washing process after synthesizing the positive electrode active material to remove the residual lithium impurities has recently been developed. However, there is a limitation in that a doping compound for improving performance of the positive electrode active material is lost during the washing process.

In order to address the above limitation, a technique for suppressing the loss of the doping compound for an improvement in performance, such as output characteristics and life characteristics, of the battery while removing the residual lithium impurities through the washing process has currently been developed, but satisfactory results have not yet been obtained. Thus, research on a method of preparing a positive electrode active material, which may improve electrochemical performance and stability of the lithium secondary battery, is urgently required.

DISCLOSURE OF THE INVENTION

Technical Problem

An aspect of the present invention provides a method of preparing a positive electrode active material, in which life characteristics of a battery are improved by suppressing the loss of a doping compound while removing lithium impurities through a washing process, and a lithium secondary battery using the same.

Technical Solution

According to an aspect of the present invention, there is provided a method of preparing a positive electrode active material which includes forming a tungsten-doped lithium transition metal oxide; and washing the lithium transition metal oxide with a washing liquid, wherein, in the washing, a hydroxide-based compound is added to the washing liquid during the washing.

According to another aspect of the present invention, there are provided a positive electrode and a lithium secondary battery which include the positive electrode active material.

Advantageous Effects

Since a tungsten-doped lithium transition metal oxide according to the present invention may be washed with a washing liquid to suppress remaining of lithium impurities on a surface of the lithium transition metal oxide, life characteristics and safety of a battery may be improved.

Also, when a hydroxide-based compound is added to the washing liquid during the washing, since tungstate anions may form a coating portion on the surface of the lithium transition metal oxide with metal cations of the hydroxide-based compound even if the tungstate anions are dissolved from the tungsten-doped lithium transition metal oxide, a loss of the doping tungsten from the positive electrode active material may be prevented, and thus, performance of the battery may be improved.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Method of Preparing Positive Electrode Active Material>

Hereinafter, a method of preparing a positive electrode active material according to the present invention will be described.

The method of preparing a positive electrode active material according to the present invention includes the steps of: (1) forming a tungsten-doped lithium transition metal oxide, and (2) washing the lithium transition metal oxide. After the washing, a positive electrode active material according to the present invention may be prepared by further (3) drying and heat treating the tungsten-doped lithium transition metal oxide.

In this case, in the washing, a hydroxide-based compound is added to a washing liquid during the washing. Hereinafter, each step will be described in detail.

(1) Tungsten-Doped Lithium Transition Metal Oxide Forming Step

First, a step of forming a tungsten-doped lithium transition metal oxide will be described.

The tungsten-doped lithium transition metal oxide may be prepared by a known method and is not particularly limited, but may be formed by at least one method selected from methods including 1) a method of mixing a lithium compound, a transition metal precursor, and a tungsten doping source together and then sintering the mixture, 2) a method of mixing a lithium compound and a tungsten-doped transition metal precursor and then sintering the mixture, and 3) a method of mixing a lithium compound and a transition metal precursor and sintering the mixture, mixing the sintered material and a tungsten doping source, and then re-sintering the mixture.

Preferably, the tungsten-doped lithium transition metal oxide may be formed by 1) the method of mixing a lithium compound, a transition metal precursor, and a tungsten doping source together and then sintering the mixture.

The lithium compound, as a compound including lithium, is not particularly limited as long as it may be used as a lithium source. For example, the lithium compound may be at least one selected from the group consisting of lithium carbonate ($Li_2CO_3$), lithium hydroxide (LiOH), lithium nitrate ($LiNO_3$), and lithium hydrate ($LiOH \cdot H_2O$).

The transition metal precursor may include at least one transition metal cation selected from the group consisting of nickel (Ni), cobalt (Co), and manganese (Mn).

For example, the transition metal precursor may include at least one transition metal cation selected from the group consisting of Ni, Co, and Mn, and may be hydroxide, carbonate, or nitrate including the transition metal cation.

Specifically, the transition metal precursor includes the transition metal cations of nickel (Ni), cobalt (Co), and manganese (Mn), Ni may be included in an amount of 80 mol % or more, preferably 85 mol % or more, and more preferably 88 mol % or more based on a total amount of transition metals, and, in a case in which the transition metal cations of nickel (Ni) are included in an amount within the above range, high capacity may be achieved.

The tungsten doping source is a compound including a tungsten (W) element, wherein the tungsten doping source, for example, may include at least one selected from the group consisting of a tungsten oxide, such as tungsten trioxide ($WO_3$) and tungstic acid ($H_2WO_4$), a tungstate salt, such as ammonium paratungstate ($(NH_4)_{10}H_2(W_2O_7)_6$) and ammonium metatungstate ($(NH_4)_6H_2W_{12}O_{40}$), and boronated tungsten such as tungsten boride (WB, $W_2B_5$). Specifically, the tungsten doping source may be a tungsten oxide such as tungsten trioxide ($WO_3$) and tungstic acid ($H_2WO_4$).

The lithium compound and the transition metal precursor may be mixed in a molar ratio of 1.01:1 to 1.07:1, preferably 1.01:1 to 1.06:1, and more preferably 1.02:1 to 1.05:1. With respect to the lithium compound, since it may be easily volatilized at a high temperature, an excessive amount of the lithium compound relative to the transition metal precursor must be added. Thus, it is desirable for the lithium compound to be mixed within the above molar ratio range.

The tungsten doping source may be included in an amount of 0.1 wt % to 20 wt %, for example, 0.1 wt % to 10 wt % based on a combined weight of the lithium compound and the transition metal precursor. The amount of the tungsten doping source may vary depending on doping condition and doping amount, but it is desirable for the tungsten doping source to be included within the above range in consideration of economic efficiency.

In order to mix the lithium compound, the transition metal precursor, and the tungsten doping source, a conventional dry process and a mixing process, in which a dry process and a wet process are combined, may be used without limitation, and typical mixing may be performed for uniform mixing.

Thereafter, the mixture subjected to the mixing process may be sintered to form a tungsten-doped lithium transition metal oxide.

For example, the sintering for forming the lithium transition metal oxide may be performed in a temperature range of 700° C. to 900° C., preferably 700° C. to 880° C., and more preferably 700° C. to 850° C. for 8 hours to 12 hours. In a case in which the sintering is performed in the above temperature range, since the lithium compound and the transition metal precursor sufficiently react, remaining of the lithium impurities may be suppressed. Also, the inside and surface of the lithium transition metal oxide may be stably doped with the tungsten doping source.

(2) Tungsten-doped Lithium Transition Metal Oxide Washing Step

The washing may be performed by the steps of: 1) primarily stirring after adding the tungsten-doped lithium transition metal oxide to the washing liquid, and 2) adding the hydroxide-based compound to the washing liquid and secondarily stirring after the primarily stirring.

Lithium impurities remaining without forming a lithium transition metal oxide are present on a surface of the tungsten-doped lithium transition metal oxide. Particularly, in a case in which a transition metal of a high-Ni system is used, since a residual amount of the lithium impurities is greater than the case where other types of transition metals are used, it is desirable that the lithium transition metal oxide is subjected to washing after the preparation thereof.

The lithium impurities may be removed when the tungsten-doped lithium transition metal oxide is washed, but there is a limitation in that tungstate anions (e.g., $WO_4^{2-}$) are lost from the tungsten-doped lithium transition metal oxide while being ionized by the washing liquid.

Also, even though the doped tungsten is not ionized as the tungstate anions, when the tungsten-doped lithium transition metal oxide is subjected to the washing process, the doped tungsten is present in an unstable state so that the doped tungsten may be dissolved out during charge and discharge of the battery, and there is a limitation in that cycle characteristics of the secondary battery degrade as a part of the dissolved tungsten is precipitated.

Thus, the present inventors have studied a method of preventing the loss of the doped tungsten while removing the residual lithium impurities present on the surface of the tungsten-doped lithium transition metal oxide.

As a result, the present inventors have confirmed that, in a case in which a hydroxide-based compound is added to the washing liquid, since metal cations of the hydroxide-based compound and the tungstate anions dissolved out during the washing of the tungsten-doped lithium transition metal oxide form a complex and the complex forms a coating portion on the surface of the tungsten-doped lithium transition metal oxide, an amount of tungsten oxide dissolved is reduced and the cycle characteristics of the battery are improved.

In a case in which washing is performed by initially adding the hydroxide-based compound to the washing liquid, tungstate anions ($WO_4^{2-}$) and metal cations of the hydroxide-based compound form a complex in a state in which lithium impurities are not removed, and thus, a coating portion is formed on the surface of the lithium transition metal oxide. In this case, since the coating portion physically blocks an outermost entrance of lithium (Li) path on the surface of the positive electrode active material, it is unfavorable to initial resistance and, simultaneously, long-life characteristics as well as basic powder properties may not only be degraded by the residual lithium impurities, which are not properly removed, and other by-products, but the lithium transition metal oxide may also be thermally unstable.

Thus, after the tungsten-doped lithium transition metal oxide is first washed by only using the washing liquid, the tungsten-doped lithium transition metal oxide washed is again washed with the washing liquid to which the hydroxide-based compound is added. In a case in which the washing step is dividedly performed as described above, the tungstate anions and the hydroxide-based compound may stably form a complex in a state in which the impurities are removed from the surface of the tungsten-doped lithium transition metal oxide.

(2)-1) Primary Stirring Step

The primary stirring step is a step of stirring after adding the tungsten-doped lithium transition metal oxide to the washing liquid.

When the above step is performed, impurities on the surface and in the inside of the tungsten-doped lithium transition metal oxide may be removed.

The washing liquid includes distilled water, and a temperature of the washing liquid may be in a range of 5° C. to 30° C., preferably 5° C. to 25° C., and more preferably 10° C. to 25° C. In a case in which the temperature of the washing liquid is set within the above range, a side reaction does not occur during the washing, and a reaction, in which the complex is formed on surfaces of tungsten-doped lithium transition metal oxide particles, may smoothly proceed.

Specifically, the above step may be performed by adding the washing liquid to a 1 L reactor in an amount of 20 vol % to 60 vol %, preferably 20 vol % to 50 vol %, and more preferably 20 vol % to 40 vol % based on a volume of the reactor, and stirring for 10 minutes to 30 minutes, preferably 10 minutes to 25 minutes, and more preferably 10 minutes to 20 minutes while a stirring speed in the reactor is maintained at 100 rpm to 500 rpm, preferably 100 rpm to 400 rpm, and more preferably 100 rpm to 300 rpm.

(2)-2) Secondary Stirring Step

The secondary stirring step is a step of adding the hydroxide-based compound to the washing liquid and stirring after the primarily stirring.

Specifically, the above step is a step in which the metal cations of the hydroxide-based compound and the tungstate anions dissolved from the tungsten-doped lithium transition metal oxide form a coating portion on the surface of the tungsten-doped lithium transition metal oxide.

The hydroxide-based compound is a compound capable of forming the coating portion on the surface of the tungsten-doped lithium transition metal oxide by being reacted with the tungstate anions dissolved from the tungsten-doped lithium transition metal oxide, wherein it is a compound capable of forming metal cations and hydroxide ions ($OH^-$) at the same time when it is dissolved in the washing liquid.

For example, the hydroxide-based compound may be at least one selected from the group consisting of aluminum hydroxide ($Al(OH)_3$), magnesium hydroxide ($Mg(OH)_2$), cobalt hydroxide ($Co(OH)_2$), calcium hydroxide ($Ca(OH)_2$), barium hydroxide ($Ba(OH)_2$), and strontium hydroxide ($Sr(OH)_2$).

In this case, the hydroxide-based compound may be added into the reactor in an amount such that a weight ratio of tungsten doped in the lithium transition metal oxide to metal cations of the hydroxide-based compound is in a range of 1:0.3 to 1:0.6. Preferably, the hydroxide-based compound may be added in an amount such that the weight ratio of the tungsten doped in the lithium transition metal oxide to the metal cations of the hydroxide-based compound is in a range of 1:0.4 to 1:0.6, for example, 1:0.4 to 1:0.5.

In a case in which the hydroxide-based compound is included in an amount within the above range, the tungstate anions and the hydroxide-based compound may form a stable coating portion on the surfaces of the tungsten-doped lithium transition metal oxide particles while capacity of the positive electrode active material using the hydroxide-based compound is maintained at a predetermined level.

Specifically, the above step may be performed by adding the hydroxide-based compound to the 1 L reactor and then stirring for 10 minutes to 30 minutes, preferably 10 minutes to 25 minutes, and more preferably 10 minutes to 20 minutes, after the primary stirring step.

After the completion of the primary and secondary stirring steps, a step of filtering the lithium transition metal oxide from the washing liquid may be further performed. The filtering step may be performed according to a conventional filtering process.

(3) Tungsten-Doped Lithium Transition Metal Oxide Drying and Heat Treating Step

After the tungsten-doped lithium transition metal oxide filtered is dried, a heat treatment may be preformed.

The drying process may be performed according to a conventional drying method and may be performed in a temperature range of 80° C. to 200° C., for example, 100° C. to 180° C. by a method such as hot air injection and vacuum drying, and the drying process may be performed for 1 hour to 3 hours, for example, 1 hour to 2 hours.

Thereafter, the tungsten-doped lithium transition metal oxide dried may be heat-treated to prepare a positive electrode active material.

For example, the heat treatment may be performed in a temperature range of 250° C. to 600° C., preferably 300° C. to 600° C., and more preferably 300° C. to 550° C. for 1 hour to 5 hours, preferably 1 hour to 4 hours, and more preferably 2 hours to 4 hours in oxygen or air. If the heat treatment is performed in the above temperature range, since crystallinity of the lithium transition metal oxide is improved, its structure may be stably formed. Also, since the coating portion formed through the washing step may be more stably formed, performance and life characteristics of the battery may also be improved.

<Positive Electrode>

Hereinafter, a positive electrode including a positive electrode active material prepared according to the above preparation method will be described.

Specifically, the positive electrode includes a positive electrode collector and a positive electrode active material layer which is disposed on the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the positive electrode active material may be typically included in an amount of 70 wt % to 99.8 wt %, preferably 75 wt % to 99.8 wt %, and more preferably 80 wt % to 99.8 wt % based on a total weight of the positive electrode active material layer.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 30 wt %, preferably 0.1 wt % to 25 wt %, and more preferably 0.1 wt % to 20 wt % based on the total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 30 wt %, preferably 0.1 wt % to 25 wt %, and more preferably 0.1 wt % to 20 wt % based on the total weight of the positive electrode active material layer.

The positive electrode may be prepared according to a typical method of preparing a positive electrode except that the above-described positive electrode active material is used. Specifically, a composition for forming a positive electrode active material layer in the form of a slurry, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the composition for forming a positive electrode active material layer and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

<Lithium Secondary Battery>

Hereinafter, a lithium secondary battery including the positive electrode, a negative electrode, a separator disposed between the positive electrode and the negative electrode, and an electrolyte will be described.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500

µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

As another example, lithium metal may be used as the negative electrode.

The binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1

(1) Tungsten-Doped Lithium Transition Metal Oxide Preparation

After 200 g of a mixture, in which a lithium compound (LiOH) and a transition metal precursor ($Ni_{0.90}Co_{0.07}Mn_{0.03}(OH)_2$) were mixed in a molar ratio of 1.03:1, was prepared and 1.2 g of $WO_3$ was added thereto, the mixture was put in a planetary mill and then mixed at 2,000 rpm for 10 minutes to prepare a mixture. The mixture was sintered at 760° C. for 12 hours to prepare a tungsten-doped lithium transition metal oxide.

(2) Washing of Tungsten-Doped Lithium Transition Metal Oxide

After 300 mL of distilled water at 20° C. was put in a 1 L reactor, 150 g of the tungsten-doped lithium transition metal oxide was added thereto and stirred for 10 minutes while a stirring speed in the reactor was maintained at 200 rpm. Thereafter, 0.87 g of $Al(OH)_3$ was added into the reactor and then stirred for 15 minutes while the stirring speed in the reactor was again maintained at 200 rpm. The tungsten-doped lithium transition metal oxide, after the completion of the stirring, was filtered.

(3) Drying and Heat Treating of Tungsten-Doped Lithium Transition Metal Oxide

After the filtering, the tungsten-doped lithium transition metal oxide was dried at 130° C. for 1 hour. Thereafter, the dried lithium transition metal oxide was heat-treated at 500° C. for 2 hours in an oxygen atmosphere to prepare a positive electrode active material.

Example 2

A positive electrode active material was prepared in the same manner except that 0.6 g of $WO_3$ was added in Example 1.

Example 3

A positive electrode active material was prepared in the same manner except that 0.43 g of $Al(OH)_3$ was added in Example 1.

Example 4

A positive electrode active material was prepared in the same manner except that 0.47 g of $Co(OH)_3$ was added in Example 1.

Comparative Examples

Comparative Example 1

A positive electrode active material was prepared in the same manner except that $Al(OH)_3$ was not added in the washing step in Example 1.

Comparative Example 2

$Al(OH)_3$ was not added in the washing step in Example 1, and washing was performed only with distilled water at 20° C. Thereafter, after the washed lithium transition metal oxide was dried at 130° C. for 1 hour, 0.87 g of $Al(OH)_3$ was added, and the mixture was put in a planetary mill and then mixed at 2,000 rpm for 10 minutes to prepare a mixture. Thereafter, the mixture was heat-treated at 500° C. for 2 hours to prepare a positive electrode active material.

Comparative Example 3

0.2395 g of LiOH was dissolved in 300 mL of distilled water at 20° C. to prepare a washing liquid, and the washing liquid was put in a 1 L reactor. Thereafter, 150 g of a tungsten-doped lithium transition metal oxide prepared as in (1) of Example 1 was added thereto and stirred for 25 minutes while a stirring speed in the reactor was maintained at 200 rpm. The tungsten-doped lithium transition metal oxide, after the completion of the stirring, was filtered. Thereafter, the tungsten-doped lithium transition metal oxide filtered was dried and heat-treated in the same manner as in (3) of Example 1 to prepare a positive electrode active material.

Comparative Example 4

A positive electrode active material was prepared in the same manner except that a washing liquid, in which 0.6995 g of $LiNO_3$, instead of LiOH, was dissolved, was used in Comparative Example 3.

Preparation Example: Preparation of Lithium Secondary Batteries

Lithium secondary batteries (coin half-cells) were respectively prepared by using the positive electrode active materials prepared in Examples 1 to 4 and Comparative Examples 1 to 4.

Specifically, each of the positive electrode active materials prepared in Examples 1 to 4 and Comparative Examples 1 to 4, a carbon black conductive agent, and a PVDF binder were mixed in an N-methylpyrrolidone solvent at a weight ratio of 96.5:1.5:2.0 to prepare a composition for forming a positive electrode (viscosity: 5,000 mPa·s), and an aluminum current collector was coated with the composition, dried at 130° C., and then rolled to prepared a positive electrode.

Lithium metal was used as a negative electrode.

Each lithium secondary battery (coin half-cell) was prepared by preparing an electrode assembly by disposing a porous polyethylene separator between the positive electrode and the negative electrode prepared as described above, disposing the electrode assembly in a case, and then injecting an electrolyte into the case. In this case, the electrolyte was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Experimental Example 1: Evaluation of Tungsten Content of Positive Electrode Active Material Each of the positive electrode active materials prepared according to Examples 1 to 4 and Comparative Examples 1 to 4 was analyzed by inductively coupled plasma (ICP) spectroscopy and the resulting tungsten contents are presented in Table 1 below. For content analysis, after a predetermined amount (about 0.1 g) of the positive electrode active material was accurately weighed, 2 mL of hydrochloric acid was added thereto and then heated on a hot plate to dissolve the positive electrode active material. Thereafter, after the positive electrode active material was clearly dissolved by heating the solution while adding hydrogen peroxide thereto, the tungsten contents were measured using an inductively coupled plasma emission spectrometer (ICP, PerkinElmer OPTIMA 8000) and presented in Table 1 below.

TABLE 1

|  | Tungsten (W) content (ICP) (ppm) |
| --- | --- |
| Example 1 | 3440 |
| Example 2 | 1700 |
| Example 3 | 3000 |
| Example 4 | 3100 |
| Comparative Example 1 | 1600 |
| Comparative Example 2 | 1800 |
| Comparative Example 3 | 1500 |
| Comparative Example 4 | 1500 |

According to experimental results, it may be confirmed that the positive electrode active materials of the examples had larger tungsten contents than the positive electrode active materials of the comparative examples. The reason for this seems to be that tungsten was less lost when the hydroxide-based compound was added in the washing step. Also, with respect to Comparative Examples 3 and 4 in which LiOH or LiNO$_3$ was initially added to the washing liquid, the loss of tungsten was greater than that of the examples. In a case in which a material having Li as a cation was initially introduced into the washing liquid regardless of anions, it was intended to prevent the loss of Li, but it may be confirmed that it did not play a role in compensating for the loss of tungsten.

Experimental Example 2: Evaluation of Amount of Tungsten Dissolved

The coin half-cells (using Li metal negative electrode) respectively prepared by using the positive electrode active materials prepared in Examples 1 to 4 and Comparative Examples 1 to 4 were charged and discharged once at a constant current (CC) of 0.2 C in a voltage range of 2.5 V to 4.25 V and then charged at a current of 0.2 C to 4.25 V, and each coin half-cell was disassembled. After the positive electrode obtained from the disassembled coin half-cell was immersed in a container containing 15 mL of the electrolyte and then stored for 2 weeks in a thermostat at 60° C., an amount of tungsten dissolved into the electrolyte was analyzed by ICP (PerkinElmer OPTIMA 8000), and the results thereof are presented in Table 2 below.

TABLE 2

|  | Amount of tungsten (W) dissolved (ICP) (ppm) |
| --- | --- |
| Example 1 | 31 |
| Example 2 | 19 |
| Example 3 | 51 |
| Example 4 | 40 |
| Comparative Example 1 | 195 |
| Comparative Example 2 | 141 |
| Comparative Example 3 | 180 |
| Comparative Example 4 | 200 |

According to experimental results, it may be confirmed that amounts of tungsten dissolved into the electrolyte of the examples were smaller than those of the comparative examples. Also, with respect to Comparative Examples 3 and 4 in which LiOH or LiNO$_3$ was initially added to the washing liquid, the dissolution of tungsten was greater than that of the examples. With respect to the application of LiOH, since its anion was an OH group, it was expected to have some effect, but it was considered that the process of dispersing LiOH in advance in the washing liquid was very dangerous in terms of safety and the higher the degree of dissociation of Li cations and OH anions was, the higher the complex formation rate was. However, since the degree of dissociation of LiOH ions was low due to the positive electrode active material including an excessive amount of lithium which was not washed, it was confirmed that a large amount of ionization capable of forming a complex did not occur. Also, with respect to LiNO$_3$, it exhibited the same phenomenon as LiOH.

Experimental Example 3: Measurement of Capacity Characteristics, Rate Capability, and Cycle Characteristics of Lithium Secondary Battery The coin half-cells (using Li metal negative electrode) prepared by using the positive electrode active materials prepared in Examples 1 to 4 and Comparative Examples 1 to 4 were charged at a constant current (CC) of 0.2 C to a voltage of 4.25 V at 25° C., and, thereafter, charge in the first cycle was performed by charging the coin half-cells at a constant voltage (CV) of 4.25 V to a charge current of 0.05 mAh to measure charge capacities. After the coin half-cells were left standing for 20 minutes, the coin half-cells were discharged at a constant current of 0.2 C to a voltage of 2.5 V to measure discharge capacities in the first cycle. Charge/discharge efficiencies in the first cycle were evaluated. Thereafter, rate capabilities were respectively evaluated by varying discharge conditions to 2C. The results thereof are presented in Table 3.

TABLE 3

|  | Charge capacity (mAh/g) | Discharge capacity (mAh/g) | Charge and discharge efficiency (%) | 2 C rate 2.0 C/0.1 C (%) |
| --- | --- | --- | --- | --- |
| Example 1 | 232.8 | 207.6 | 89.9 | 87.9 |
| Example 2 | 236.6 | 213.0 | 90.0 | 85.2 |

TABLE 3-continued

|  | Charge capacity (mAh/g) | Discharge capacity (mAh/g) | Charge and discharge efficiency (%) | 2 C rate 2.0 C/0.1 C (%) |
|---|---|---|---|---|
| Example 3 | 233.9 | 211.3 | 90.3 | 86.0 |
| Example 4 | 231.5 | 209.2 | 90.3 | 86.4 |
| Comparative Example 1 | 235.9 | 213.3 | 90.5 | 84.8 |
| Comparative Example 2 | 231.3 | 207.6 | 89.7 | 84.5 |
| Comparative Example 3 | 234.6 | 205.4 | 87.6 | 84.9 |
| Comparative Example 4 | 235.0 | 199.4 | 84.9 | 84.0 |

Also, capacity retentions [%] were evaluated while 30 cycles of charge and discharge of the coin half-cells were performed by charging the coin half-cells at 0.3 C to a voltage of 4.55 V in a constant current/constant voltage (CCCV) mode at 45° C. and discharging the coin half-cells at a constant current of 1.0 C to a voltage of 3 V, and the results thereof are presented in Table 4 below.

TABLE 4

|  | Capacity retention (%) after 30 cycles at 45° C. |
|---|---|
| Example 1 | 97.2 |
| Example 2 | 96.3 |
| Example 3 | 96.0 |
| Example 4 | 96.4 |
| Comparative Example 1 | 91.8 |
| Comparative Example 2 | 94.4 |
| Comparative Example 3 | 84.7 |
| Comparative Example 4 | 83.2 |

According to experimental results, when the examples and the comparative examples were compared, it was confirmed that charge and discharge efficiencies of the examples were equal to or greater than those of the comparative examples, and, with respect to the cycle characteristics, the examples had a more improved effect than the comparative examples. With respect to Comparative Examples 3 and 4 in which LiOH or LiNO$_3$ was initially added to the washing liquid, since Li was compensated, charge capacities were equal to or lower than those of the examples, but initial efficiencies were relatively poor due to the large effect of surface resistance of the positive electrode active material and long-life characteristics were significantly degraded in comparison to those of the examples because residual lithium impurities were not sufficiently removed.

The invention claimed is:

1. A method of preparing a positive electrode active material comprising:
    forming a tungsten-doped lithium transition metal oxide; and
    washing the tungsten-doped lithium transition metal oxide with a washing liquid,
    wherein, in the washing, a hydroxide-based compound is added to the washing liquid during the washing,
    wherein the washing comprises:
        primarily stirring after adding the tungsten-doped lithium transition metal oxide to the washing liquid, and
        adding the hydroxide-based compound to the washing liquid and secondarily stirring after the primarily stirring.

2. The method of claim 1, wherein the hydroxide-based compound comprises aluminum hydroxide (Al(OH)$_3$), magnesium hydroxide (Mg(OH)$_2$), cobalt hydroxide (Co(OH)$_2$), calcium hydroxide (Ca(OH)$_2$), barium hydroxide (Ba(OH)$_2$), or strontium hydroxide (Sr(OH)$_2$).

3. The method of claim 1, wherein the hydroxide-based compound is added in an amount such that a weight ratio of tungsten doped in the lithium transition metal oxide to metal cations of the hydroxide-based compound is in a range of 1:0.3 to 1:0.6.

4. The method of claim 1, wherein, in the secondarily stirring, metal cations of the hydroxide-based compound and tungstate anions dissolved from the tungsten-doped lithium transition metal oxide form a coating portion on surfaces of particles of the tungsten-doped lithium transition metal oxide.

5. The method of claim 1, further comprising drying and heat treating the tungsten-doped lithium transition metal oxide after the washing.

6. The method of claim 5, wherein a heat treatment temperature is in a range of 250° C. to 600° C.

7. The method of claim 1, wherein the tungsten-doped lithium transition metal oxide comprises nickel (Ni), cobalt (Co), or manganese (Mn).

8. The method of claim 7, wherein the tungsten-doped lithium transition metal oxide comprises transition metal cations of nickel (Ni), cobalt (Co), and manganese (Mn), and Ni is included in an amount of 80 mol % or more based on a total amount of transition metals.

9. The method of claim 1, wherein the forming of the tungsten-doped lithium transition metal oxide comprises
    mixing a lithium compound, a transition metal precursor, and a tungsten doping source to form a mixture, and
    sintering the mixture to prepare the tungsten-doped lithium transition metal oxide.

10. A positive electrode comprising a positive electrode active material prepared according to claim 1.

11. A lithium secondary battery comprising the positive electrode of claim 10, a negative electrode, a separator disposed between the positive electrode and the negative electrode, and an electrolyte.

12. The lithium second battery of claim 11, wherein the positive electrode active material of the positive electrode has a tungsten content of 1700 ppm to 3440 ppm.

13. The positive electrode of claim 10, wherein the positive electrode active material has a tungsten content of 1700 ppm to 3440 ppm.

* * * * *